United States Patent Office 3,637,862
Patented Jan. 25, 1972

3,637,862
ANETHOLE MERCAPTAN
Paul F. Warner, Phillips, Tex., and James W. Stanley, Jr., Bartlesville, Okla., assignors to Phillips Petroleum Company
No Drawing. Filed Feb. 9, 1967, Ser. No. 614,815
Int. Cl. C07c *149/00;* C09g *1/00*
U.S. Cl. 260—609 D   1 Claim

ABSTRACT OF THE DISCLOSURE

Anethole mercaptan, which has a mild odor and is suitable as a copper polish, is made by reacting anethole and hydrogen sulfide.

A process for producing anethole mercaptan by contacting anethole with hydrogen sulfide in the presence of ultraviolet light. The mol ratio of the hydrogen sulfide to anethole is 100:1 to 1:1 and the rate of reaction can be increased by using triphenyl phosphite and/or acetone as a promoter. The product recovered is anethole mercaptan.

---

This invention relates to a process for the preparation of anethole mercaptan. In one aspect, this invention relates to anethole mercaptan.

It is known that mercaptans may be produced by subjecting mixtures of hydrogen sulfide and olefins to activating radiation such as ultraviolet light. However, due to the undesirable odors which are characteristic of the mercaptans, new processes and products are continually being sought to produce mercaptans of mild odor. The anethole mercaptan produced according to the present invention has a licorice-like odor and is suitable as a polish.

Accordingly, an object of the invention is to provide an improved process for the preparation of a mercaptan. Another object of this invention is to provide novel mercaptans. Another object of this invention is to provide a high purity mercaptan having a mild odor.

According to the invention, we provide a process for the preparation of high purity anethole mercaptan in high yields which comprises contacting anethole with hydrogen sulfide under the influence of ultraviolet light for a period of time sufficient to form the anethole mercaptan and recovering the anethole mercaptan thus produced.

The anethole employed need not be in a form of a pure compound in order to be reacted with hydrogen sulfide in accordance with the invention for the production of anethole mercaptan, but the compound can be reacted in crude form. Thus, for example, commercial grade anethole can be used according to the invention to produce an anethole mercaptan having a purity ranging from about 94 to 96 weight percent.

Further, according to the invention, a new composition of matter is produced from the anethole feed by contacting such feed with a hydrogen sulfide in the presence of ultraviolet light. Specifically, a reaction product containing as the principal mercaptan component 1-(p-methoxyphenyl)-2-propanethiol, a novel composition, having the structural formula

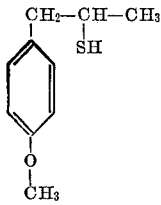

has been produced from anethole.

The hydrogen sulfide employed for the reaction of the anethole can be in the liquid state if the pressure is high enough and the temperature relatively low. The amount of hydrogen sulfide employed will vary appreciably and will generally be in the range of about 1 to 100 mols of hydrogen sulfide per mol of anethole, preferably in the range of about 5 to 20 mols of hydrogen sulfide per mol of anethole. Although the hydrogen sulfide used according to the invention can be a crude product, it has been found advantageous to distill the hydrogen sulfide prior to admixing with the anethole to remove dissolved free sulfur.

Although the reaction described herein can be carried out by using the whole range of ultraviolet radiations, that is, wave lengths in the range of 100 to 3800 angstrom units, ultraviolet radiation having wave lengths below about 2900 angstrom units are preferred. The amount of radiation can vary over a wide range and will be dependent upon other factors, such as the amount of anethole used as the reactant, the source of radiation, and other considerations. Any suitable source of radiation providing wave lengths in the ultraviolet range can be used, including such common sources as mercury lamps and hydrogen discharge tubes. The particular reatcion vessel should be transparent in part or whole to ultraviolet radiation of the desired wave length and materials such as Vycor and quartz can be used.

The anethole is treated with hydrogen sulfide under the influence of ultraviolet light according to the invention under suitable reaction conditions. The reaction of this invention can be carried out in a manner like that of the prior art and can be effected in a batch, intermittent, or continuous manner. The anethole can be dissolved in a nonreactive solvent, for example, benzene, toluene, butanol, etc. or it can be employed without a solvent. Hydrogen sulfide can be passed through the liquid anethole reactant or anethole solution until the reaction is substantially completed, for example, for a period varying from one-half to 72 hours or more, preferably from about 1 to about 10 hours, depending upon the conditions of reaction. Reaction temperature can vary over a wide range and generally will range from about −50 to about 300° F. The pressure at which the reaction is carried out will also vary and generally will be sufficient to maintain liquid phase conditions although vapor phase or mixed phase conditions are possible. The pressure can vary from about atmospheric to about 1000 p.s.i., although these limits are in no way critical.

No special form of apparatus is required to carry out the reaction in accordance with the invention. When atmospheric pressure is used, the reaction can be carried out in an open vessel, while the reaction under superatmospheric pressure can be carried out in any suitable means, such as an autoclave.

In actual operation, it is preferred to exclude air from the reaction mass in order to avoid oxidation of the anethole mercaptan so formed.

After the reaction is completed, the products of reaction can be recovered by any well-known separation procedure. For example, gases can be recovered or released to the atmosphere and a liquid fractionated, distilled, crystallized or subjected to various separation and recovery procedures to obtain the desired anethole mercaptan.

The anethole mercaptan produced according to the invention, because of its mild odor characteristic, can be used as a copper polish.

A better understanding of the invention can be obtained by referring to the following illustrated examples which are not intended to unduly limit the invention.

EXAMPLE

A series of runs was conducted in which a feed mixture of anethole was reacted with technical grade hydrogen sulfide in a thermal syphon type UV reactor having a capacity of 6,400 ml. The UV reactor was equipped with a 1200 watt UV light bulb. The anethole feed had the following composition and properties:

TABLE I

| | Anethole [1] |
|---|---|
| Refractive index 20/D | 1.5486 |
| Specific gravity 20/4 | 0.9759 |
| Mol weight | 149 |
| Bromine No | 194.5 |
| Total sulfur, wt. percent | |
| Mercaptan sulfur, wt. percent | |
| Mercaptan purity, wt. percent | |
| Color, Gardner | 1 |

| Distillation: | F at 5 mm. | F at 760 |
|---|---|---|
| IBP | 141 | 383 |
| 5 | 192 | 448 |
| 10 | 195 | 452 |
| 20 | 197 | 454 |
| 30 | 198 | 455 |
| 40 | 198 | 455 |
| 50 | 199 | 457 |
| 60 | 200 | 458 |
| 70 | 200 | 459 |
| 80 | 201 | 458 |
| 90 | 201 | 459 |
| 95 | 202 | 461 |

| Composition by chromatograph: | Wt. percent |
|---|---|
| Lights | 5.4 |
| Turpineol | 9.5 |
| Anethole | 80.0 |
| Unidentified light component | |
| Anethole mercaptan | |
| Heavies | 3.8 |
| Total | 98.7 |

[1] Labeled Arizole AH, 80 weight percent grade.

The above-described anethole was contacted with hydrogen sulfide at atmospheric temperature (approximately 80° F.) in a mol ratio of hydrogen sulfide to anethole of 5:1 and 10:1 under the influence of ultraviolet light. In making the runs, the anethole was charged to the reactor, then the hydrogen sulfide was added to the desired level, and the UV light was turned on. Five runs were made in the reactor to explore the effect of mol ratio and the use of reaction promoters on the production of the anethole mercaptan. The first two runs were conducted without the use of promoters and the mol ratios of hydrogen sulfide to olefin in the first run was 5:1, and in the second run 10:1. Three other runs were made using promoters wherein the mol ratio of hydrogen sulfide to olefin was 10:1. Two promoters were employed to determine the effect of the promoters on the production of the anethole mercaptan. In run number 3 triphenyl phosphite was added to the reaction mixture in the amount of one volume percent based on the reactor volume, and acetone was used as a promoter in runs 4 and 5. The amount of acetone present in runs 4 and 5 was varied and run 4 was conducted with acetone being present at one volume percent based on the reactor volume and run 5 contained 2 volume percent levels based on the reactor volume. Table II below shows the data obtained in the above-mentioned five runs. It can be seen from the table that the reaction rate was quite slow at mol ratios of five. The reaction rate was approximately doubled by employing a mol ratio of 10 mol of hydrogen sulfide per mol of anethole, and the reaction rate was further increased about 20 to 25 percent by the addition of the acetone and/or triphenyl phosphite promoters. The triphenyl phosphite and acetone promoters appear to be equally effective at one volume percent level based on the reactor volume. But no substantial increase was noted by the use of 2 volume percent acetone in the reaction.

TABLE II

Reaction rate data on synthesis of anethole mercaptan by the UV process with and without addition of promoters using a 1200 watt lamp

| Run No | 1 | 2 | 3 | 4 | 5 |
|---|---|---|---|---|---|
| Mol ratio | 5 | 10 | 10 | 10 | 10 |
| Promoter: | | | | | |
| Type | None | None | ([1]) | Acetone | Acetone |
| Amount, vol. percent | None | | [2] 1 | [2] 1 | [2] 2 |

| | Mercaptan sulfur at indicated time, wt. percent | | | | |
|---|---|---|---|---|---|
| Reaction time, hours: | | | | | |
| 0.25 | 0.83 | | | | |
| 0.5 | 1.16 | 1.93 | 2.49 | 1.90 | 1.52 |
| 1.0 | 1.97 | 2.01 | 3.16 | 2.66 | 2.44 |
| 2.0 | 2.52 | | | | |
| 3.0 | | 4.86 | 5.82 | 5.61 | 5.56 |
| 4.0 | 3.52 | | | | |
| 5.0 | | 6.93 | 8.94 | 8.60 | 8.54 |
| 6.0 | 4.78 | | | | |
| 7.0 | | 9.10 | 12.00 | 11.20 | [3] 11.69 |
| 8.0 | 5.42 | | | | |
| 9.0 | | 10.73 | 12.83 | 12.95 | 13.17 |
| 10.0 | 6.34 | | | | |
| 11.0 | | 12.47 | | 13.91 | 13.36 |
| 12.0 | 7.10 | | | | |
| 13.0 | | | | 14.55 | 13.72 |
| 13.5 | | 13.33 | | | |
| 14.0 | | | | 14.22 | |
| 15 | | | | | |
| 16 | | 13.50 | | | |

[1] Triphenyl phosphite.
[2] Volume percent based on reactor volume of 6,400 ml.
[3] 7.5 hour irradiation time.

The reaction product from runs 3, 4 and 5 above with anethole where the mol ratio of the hydrogen sulfide to the anethole was 10:1 were composited and distilled in a 1¼ inch I.D. by one foot long column packed with Protruded packing. The distillation data are shown in the following table.

TABLE III

Distillation data for crude anethole mercaptan [1] made by the UV process at 10 to 1 mol ratio H₂S to anethole

| Cut | Temperature, °F. | | | Volume, ml. | | Volume percent [3] | Pressure, mm. Hg | Mercaptan sulfur, wt. percent |
|---|---|---|---|---|---|---|---|---|
| | Overhead | Corrected OH [2] | Kettle | Cut | Cumulative | | | |
| IBP | 143 | 385 | 240 | | | | 5.0 | |
| 1 | 177 | 420 | 258 | 100 | 100 | 2.9 | 5.0 | 1.39 |
| 2 | 191 | 447 | 265 | 100 | 200 | 5.7 | 5.0 | |
| 3 | 215 | 477 | 276 | 100 | 300 | 8.6 | 5.0 | 3.70 |
| 4 | 229 | 494 | 280 | 100 | 400 | 11.4 | 5.0 | |
| 5 | 241 | 509 | 286 | 100 | 500 | 14.3 | 5.0 | |
| 6 | 243 | 516 | 288 | 100 | 600 | 17.1 | 4.6 | [4] 10.04 |
| | 248 | 518 | 290 | 100 | 700 | 20.0 | 5.0 | 16.22 |
| 7 | 250 | 520 | 292 | 200 | 900 | 25.7 | 5.0 | |
| | 550 | 520 | 292 | 400 | 1,100 | 31.5 | 5.0 | |
| | 250 | 520 | 292 | 450 | 1,150 | 32.9 | 5.0 | |
| | 250 | 520 | 292 | 100 | 1,250 | 35.7 | 5.0 | |
| 8 | 250 | 520 | 294 | 200 | 1,350 | 38.6 | 5.0 | |
| | 210 | 526 | 292 | 300 | 1,450 | 41.5 | 1.0 | |
| | 208 | 542 | 290 | 400 | 1,550 | 44.3 | 0.8 | |
| | 207 | 542 | 288 | 500 | 1,650 | 47.2 | 0.8 | |
| | 212 | 549 | 302 | 250 | 1,900 | 54.3 | 0.8 | |
| 9 | 214 | 552 | 310 | 300 | 1,950 | 55.7 | 0.8 | |
| | 217 | 556 | 320 | 400 | 2,050 | 58.6 | 0.8 | |
| 10 | 222 | 563 | 336 | 500 | 2,150 | 61.4 | 0.8 | 17.58 |
| | 230 | 535 | 370 | 100 | 2,250 | 64.4 | 2.0 | |
| 11 | 232 | 521 | 382 | 150 | 2,300 | 65.8 | 3.0 | 15.3 |
| Kettle product, 3.074 lb | | | | 1,200 | 3,500 | 100.0 | | |

[1] Charge 3,656 ml. (8.516 lb.) to 1¼ in. I.D. by 1 ft. long column packed with Protruded packing (a thin gauge stainless steel perforated truncated cone from Scientific Development Co., State College, Pa.). Took over the first six cuts at reflux ratio of 5; the rest of the distillation was run at reflux ratio of 1.
[2] Corrected to 760 mm. Hg absolute pressure.
[3] 100 percent recovery basis. Actual recovery was 98.3 volume percent.
[4] Composited Cuts 6-11 as the mercaptan product.

A material balance for the two runs is shown in the following table.

TABLE IV
Run and material balance data for synthesis of anethole mercaptan at mol ratio of 10 with and without triphenyl phosphite promoter

| | Volume, ml. | Grams | Mols | Mol percent |
|---|---|---|---|---|
| A. Conditions of run: Reactor: 6,400 ml. thermal siphon. UV lamp: 1,200 watts. Mol ratio: $H_2S$ to olefin 10. | | | | |
| B. Charge to reactor (2 Runs): | | | | |
|   Arizole AH [1] | 3,360 | 3,280 | | |
|   Anethole content | | 2,630 | 17.7 | 100 |
|   Triphenyl phosphite | 64 | | | |
|   Hydrogen sulfide | 9,378 | 7,410 | 218 | |
| C. Crude product recovered | 3,655 | 3,870 | | |
| D. Product recovered by distillation: | | | | |
|   Light ends | 103 | | | |
|   Unreacted olefin [2] | 500 | 486 | 1.1[3] | |
|   Anethole mercaptan | 1,700 | 1,800 | 10.3 | 58.2 |
|   Heavies (assumed to be sulfide) | 1,200 | 1,395 | 8.4 | |
|     Total | 3,503 | 3,761 | 19.8 | |
| E. Yield of anethole mercaptan: | | | | |
|   Mol percent based on anethole charged | | | | 58.2 |
|   Pounds per pound of crude anethole charged | | | | 0.57 |

[1] 80 weight percent grade.
[2] Contained 32.6 wt. percent anethole.
[3] Based on contained anethole.

The reaction product from the two runs 4 and 5 with acetone promoter were composited and distilled in the same column described previously. The distillation data are shown in the following table.

TABLE VI
Run and material balance data on synthesis of anethole mercaptan by the UV process with acetone as promoter

| | Milliliters | Grams | Mols | Mol percent |
|---|---|---|---|---|
| A. Conditions: Reactor, thermal siphon, 6,400 ml. Lamp Hanovia, 1,200 watt. Mol ratio $H_2S$/olefin, 10. | | | | |
| B. Reactor charge (2 runs): | | | | |
|   Arizole AH (crude anethole) [1] | 3,360 | 3,280 | | |
|   Anethole content | | 2,625 | 17.7 | 100 |
|   Hydrogen sulfide | 9,248 | 7,300 | 215.0 | |
|   Acetone | 192 | 151 | | |
| C. Crude product recovered after flashing $H_2S$ | 2,790 | 4,020 | | |
| D. Products recovered by distillation: | | | | |
|   Acetone | 165 | 127 | | |
|   Unreacted light ends [2] | 565 | 180 | 1.2 | |
|   Anethole mercaptan | 1,600 | 1,650 | 9.1 | 51.4 |
|   Heavies (assumed to be sulfide) | 1,435 | 1,715 | 10.4 | |
|     Total | 3,672 | | 20.7 | |
| E. Yield of anethole mercaptan: | | | | |
|   Mol percent based on anethole charged | | | | 51.4 |
|   Pounds per pound of crude anethole charged | | | | 0.50 |

[1] 80 weight percent grade.
[2] Contained only 32.6 wt. percent anethole.

The distillation data of Tables III and V noted above show that there is no problem in making anethole mercaptan of high purity by distillation of the reaction product in a distillation column having the equivalent of 10 to 12 plates. Further, the addition of promoters such as triphenyl phosphite and acetone increase the rate of the formation of the anethole mercaptan without adversely affecting the finished product. It can also be seen in Tables IV and VI that the yield of anethole mercaptan was 51.4 mol percent in one case and 58.2 mol percent in the

TABLE V
Distillation data for anethole mercaptan [1] made at 10/1 mol ratio $H_2S$ to olefin by the UV process with acetone as promoter

| | Temperature, °F. | | | Pressure, mm. Hg | Volume, ml. | | Volume percent | Mercaptan sulfur, wt. percent |
|---|---|---|---|---|---|---|---|---|
| Cut | Obs. overhead | Corr. overhead [2] | Kettle | | Cut | Cumulative | | |
| Traps | | | | | 165 | 165 | 4.4 | |
| IBP | 120 | 125 | 230 | 685 | | | | |
| 1 | 120 | 125 | 232 | 685 | 85 | 250 | 6.6 | |
| 2 | 179 | 431 | 259 | 5.0 | 100 | 350 | 9.3 | 2.28 |
| 3 | 187 | 442 | 268 | 5.0 | 100 | 450 | 11.8 | |
| 4 | 210 | 471 | 276 | 5.0 | 100 | 550 | 14.5 | 3.15 |
| 5 | 214 | 514 | 274 | 2.0 | 100 | 650 | 17.1 | |
| 6 | 221 | 523 | 276 | 2.0 | 100 | 750 | 19.8 | 12.15 |
| | 224 | 527 | 280 | 2.0 | 100 | 850 | 22.4 | 15.00[3] |
| | 226 | 530 | 283 | 2.0 | 100 | 950 | 25.0 | |
| 7 | 227 | 531 | 291 | 2.0 | 200 | 1,050 | 27.8 | |
| | 227 | 531 | 294 | 2.0 | 100 | 1,150 | 30.4 | |
| | 227 | 531 | 298 | 2.0 | 400 | 1,250 | 33.0 | |
| | 227 | 531 | 298 | 2.0 | 500 | 1,350 | 35.7 | |
| | 227 | 531 | 302 | 2.0 | 100 | 1,450 | 38.3 | |
| 8 | 227 | 531 | 304 | 2.0 | 200 | 1,550 | 41.0 | |
| | 227 | 531 | 306 | 2.0 | 300 | 1,650 | 43.7 | |
| | 227 | 531 | 308 | 2.0 | 400 | 1,750 | 46.3 | |
| | 230 | 535 | 314 | 2.0 | 500 | 1,850 | 48.9 | |
| | 231 | 536 | 318 | 2.0 | 100 | 1,950 | 51.5 | |
| 9 | 232 | 538 | 322 | 2.0 | 200 | 2,050 | 54.1 | |
| | 234 | 540 | 332 | 2.0 | 300 | 2,150 | 56.9 | |
| | 240 | 531 | 346 | 8.0 | 400 | 2,250 | 59.5 | |
| 10 | 244 | 533 | 356 | 3.2 | 500 | 2,350 | 62.0 | 17.05 |
| 11 | 252 | | 405 | 7.0 | 285 | 2,635 | 69.6 | 13.05 |
| Kettle product, 3.150 lb. | | | | | 1,150 | 2,786 | 100.0 | |

[1] Charge 3,790 ml (8,837 lb.) to 1¼ in. I.D. by 1 foot long column packed with Protruded packing. Took over the first seven cuts at reflux ratio of 5 and the rest at reflux ratio of 1.
[2] Corrected to 760 mm. absolute pressure.
[3] Composite Cuts 7 to 10 as product (3.615 lb.).

A material balance from these runs is shown in the following table.

other. The material balances in these tables are incomplete because it is not possible to give accurate material balance data for the other components in the mixture because there are too many unknowns. Therefore, the balances show only the yield of anethole mercaptan produced based on the amount of anethole charge.

The fractionation data for the run made at a 5:1 mol ratio of hydrogen sulfide to anethole are not shown. However, the anethole mercaptan produced from this run was composited to make a final blend. All cuts from the distillation having a mercaptan sulfur above 15.0 weight percent were composited to make the final product. Table VII shows that the reaction product so formed on the reacting of hydrogen sulfide with anethole in the presence of UV had the following properties:

TABLE VII

|  | Anethole mercaptan |
|---|---|
| Refractive index 20/D | 1.5450 |
| Specific gravity 20/4 | 1.0458 |
| Mol weight* | 179.4 |
| Bromine No |  |
| Mercaptan sulfur, wt. percent | 17.28 |
| Mercaptan purity, wt. percent | 96.9 |
| Color, Gardner | <1 |

| Distillation: | F at 5 mm. | F at 760 |
|---|---|---|
| IBP | 226 | 491 |
| 5 | 244 | 513 |
| 10 | 247 | 517 |
| 20 | 250 | 521 |
| 30 | 251 | 522 |
| 40 | 252 | 523 |
| 50 | 253 | 524 |
| 60 | 253 | 524 |
| 70 | 253 | 524 |
| 80 | 253 | 524 |
| 90 | 254 | 526 |
| 95 | 254 | 526 |

| Composition by chromatograph: | Wt. percent |
|---|---|
| Lights | 2.55 |
| Turpineol |  |
| Anethole |  |
| Unidentified light component | 2.10 |
| Anethole mercaptan | 94.37 |
| Heavies | 0.96 |
| Total | 99.98 |

*Determined by cryoscopic method using benzene as the solvent. The freezing point depression of a benzene solution is determined for several samples and an extrapolated value for molecular weight is reported.

The anethole mercaptan purity produced in accordance with the present invention was 94.37 weight percent by chromatographic analysis and 96.9 weight percent as determined by mol weight and mercaptan sulfur analysis.

It was observed from the above-described runs that the reaction rate for the production of anethole mercaptan was considerably faster employing a ratio of about 10 mol of hydrogen sulfide per mol of anethole, and that the reaction rate was further increased by the addition of the reaction promoters.

An NMR examination of the reaction product revealed that the mercaptan component was anethole mercaptan, 1-(p-methoxyphenyl)-2-propanethiol, having a structure

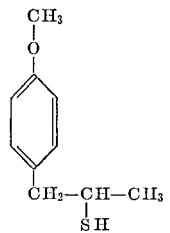

The NMR analysis revealed that the aromatic region showed the characteristic symmetrical four-line spectra of a para disubstituted benzene consisting of two doublets, the outer pair being less intense than the inner pair. The strongest peak in the spectrum was at 6.4 tau and was clearly due to the methyl protons in a methoxy group. A complex resonance observed between 6.7-7.5 tau was overlapped by a doublet centered at 7.3 tau. This doublet was in the known region for a methylene group adjacent to an aromatic ring and the splitting showed coupling with a methine group. Upfield, at 8.5 tau, was a doublet which shifted further upfield with dilution. This indicated a sensitiveness to hydrogen bonding as in a thiol group and coupling with an adjacent —CH. The other doublet at 8.8 tau was in the methyl group region of the spectrum. It was shifted slightly downfield from the normal position for an alkyl methyl group. This paramagnetic shift showed the deshielding effect of the electronegative thiol group.

A sample of the anethole mercaptan was applied to a soft cloth and the cloth was then rubbed over a corroded copper surface. The surface was then washed and considerable brightness to the copper surface resulted.

We claim:
1. Anethole mercaptan having the general formula

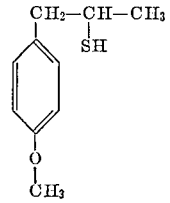

References Cited

UNITED STATES PATENTS 2,957,919  10/1960  Nutting et al. ____ 260—609 X

OTHER REFERENCES

Maccagnani: "Chem. Abstracts," vol. 64 (1966), p. 1739S.

CHARLES B. PARKER, Primary Examiner

D. R. PHILLIPS, Assistant Examiner

U.S. Cl. X.R.
252—79.1; 260—609 B